United States Patent [19]

Peterson

[11] 4,133,090

[45] Jan. 9, 1979

[54] CONTROL OF BINDER CONTENT IN CARBON ARTICLE MANUFACTURE

[75] Inventor: Richard W. Peterson, Lower Burrell, Pa.

[73] Assignee: Aluminum Company of America, Pittsburgh, Pa.

[21] Appl. No.: 806,715

[22] Filed: Jun. 15, 1977

[51] Int. Cl.² ............................................. H01J 9/00
[52] U.S. Cl. ..................................... 29/25.18; 73/54; 106/284
[58] Field of Search ........................... 73/54; 106/284; 425/140; 29/25.18, 25.19

[56] References Cited

U.S. PATENT DOCUMENTS

| | | | |
|---|---|---|---|
| 1,233,843 | 2/1913 | Chapman | 73/54 |
| 2,259,491 | 10/1941 | Roller | 73/54 |
| 3,009,863 | 11/1961 | Angevine | 106/284 |
| 3,689,299 | 9/1972 | Brown | 106/284 |

Primary Examiner—Herbert Goldstein
Attorney, Agent, or Firm—Daniel A. Sullivan, Jr.

[57] ABSTRACT

A method of preparing carbon articles including the steps of mixing binder and carbon aggregate, forming the resulting mixture into an article, measuring the slump of the article at least to hundredths of an inch following the forming and prior to baking, and, if necessary, changing the relative proportions of binder and carbon aggregate in subsequent executions of the mixing step to yield a target amount of slump.

1 Claim, 11 Drawing Figures

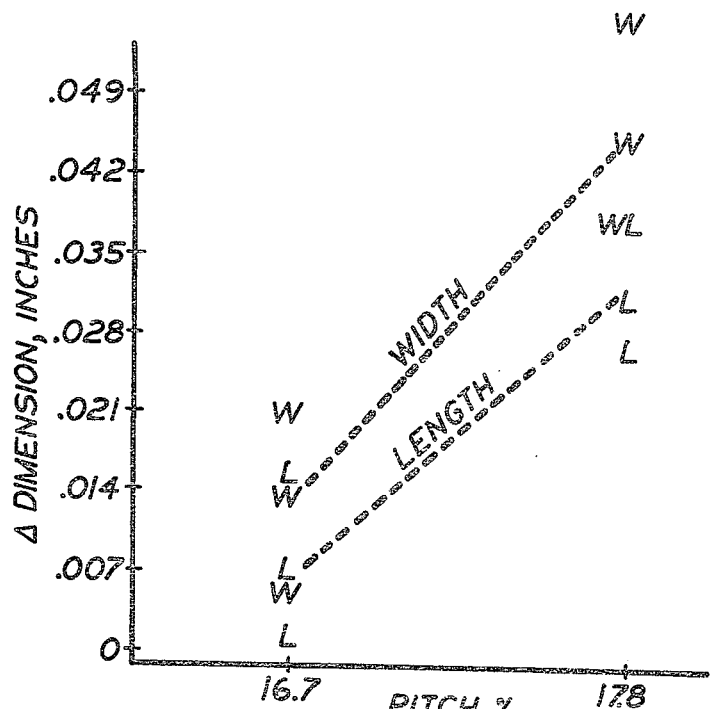
Fig. 9 COMPARISON OF SLUMPING ON WIDTH AND LENGTH
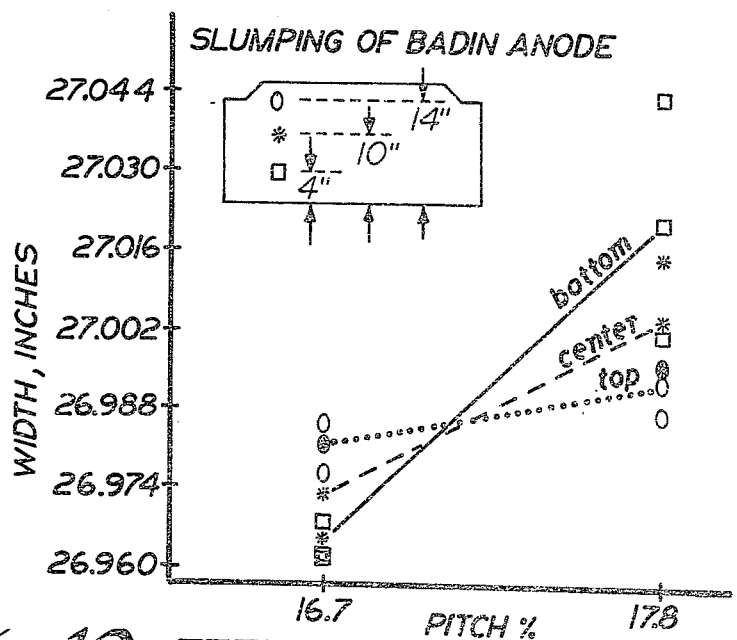
Fig. 10 EFFECT OF ELEVATION OF MEASURING POINT

CONTROL OF BINDER CONTENT IN CARBON ARTICLE MANUFACTURE

BACKGROUND OF THE INVENTION

The present invention relates to the manufacture of carbon articles from mixtures of binder and carbon aggregate.

It has been shown in studies on baked carbon articles used, e.g. in the aluminum industry as electrodes, that properties of interest, for example, baked apparent density, move through e.g. maximum values as binder content is increased from zero relative to the carbonaceous aggregate content. See, for instance, the article entitled "Dependence of the Density and Other Properties of Bonded Carbons on the Binder Proportion in the Green Mix", by J. Okada and Y. Takeuchi, in *Proceedings of the Fourth Conference on Carbon*, (New York: Pergamon Press, 1960). The optimum amount of binder will, however, vary depending on such things as the microstructure of the carbon aggregate, the particle size distribution of the carbon aggregate, etc. See, for instance, the text of the paper entitled "Optimum Adjustment of Pitch Content in the Fabrication of Prebaked Anodes Moulded with a Press in the Aluminum Industry", by M. Jarry and J. Pinoir, reproduced in *Proceedings of the Third Czechoslovakian Aluminum Symposium*, held in Banska Bystrica on Sept. 21, 1976.

SUMMARY OF THE INVENTION

It is an object of the present invention to provide for improved control of the amount of pitch used in the manufacture of carbon articles from pitch/carbon aggregate mixtures.

Another object of the present invention is to provide a production line technique for sensing whether the binder content is optimum, without actually having to run, for example, the volume and weight tests needed to determine baked apparent density.

These as well as other objects which will become apparent in the discussion that follows are achieved, according to the present invention, by providing a method of preparing carbon articles including the steps of mixing binder and carbon aggregate, forming the resulting mixture into an article, measuring the slump of the article at least to hundredths of an inch following the forming and prior to baking, and, if necessary, changing the relative proportions of binder and carbon aggregate in subsequent executions of the mixing step to yield a target amount of slump.

The term "slump" refers to the amount a dimension has changed. For instance, if a dimension is initially set by compaction of the mixture in a mold and the resulting article is removed from the mold and set aside, its initially set dimensions will change due to the weight of the higher placed parts of the article pressing on the lower placed parts. This change of dimension is referred to as slump.

In using the present invention, however, slump does not have to be expressed directly. It can be expressed indirectly, for instance, by just giving the final dimension and not subtracting off the original dimension. Or, it can just be expressed as a voltage read from a linear variable differential transformer, it being then just a matter of having a calibration relationship between the voltage and the desired property, e.g. baked apparent density.

BRIEF DESCRIPTION OF THE DRAWINGS

FIG. 9 is a graph of dimensional change versus binder content and compares the dimensional change which occurs in the width and length of a given anode.

FIG. 10 is a graph of anode width measurement versus binder content for a given anode where the elevation of the measuring point on the anode is varied.

DESCRIPTION OF THE PREFERRED EMBODIMENTS

Figure 1:
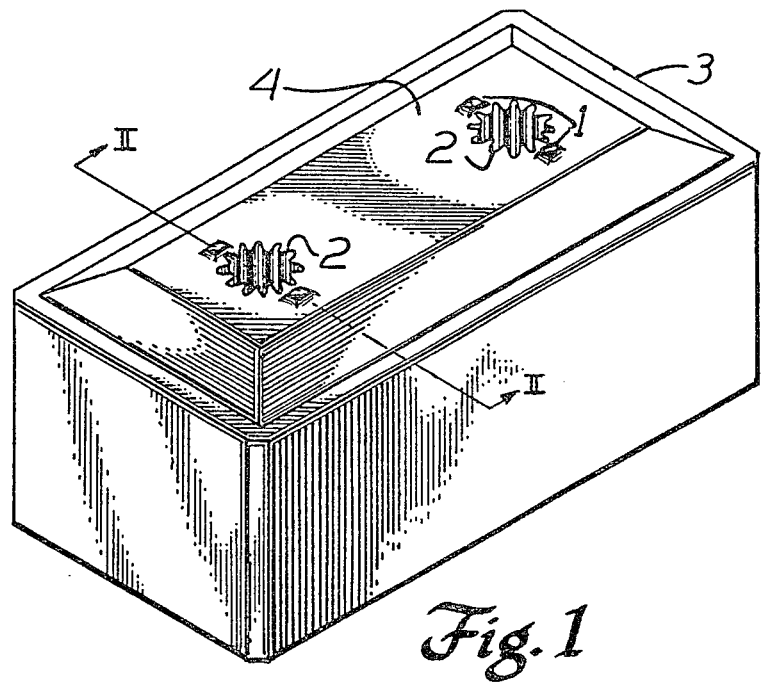
FIG. 1 is a perspective view of an electrode used in an embodiment of the method of the present invention.
Figure 2:
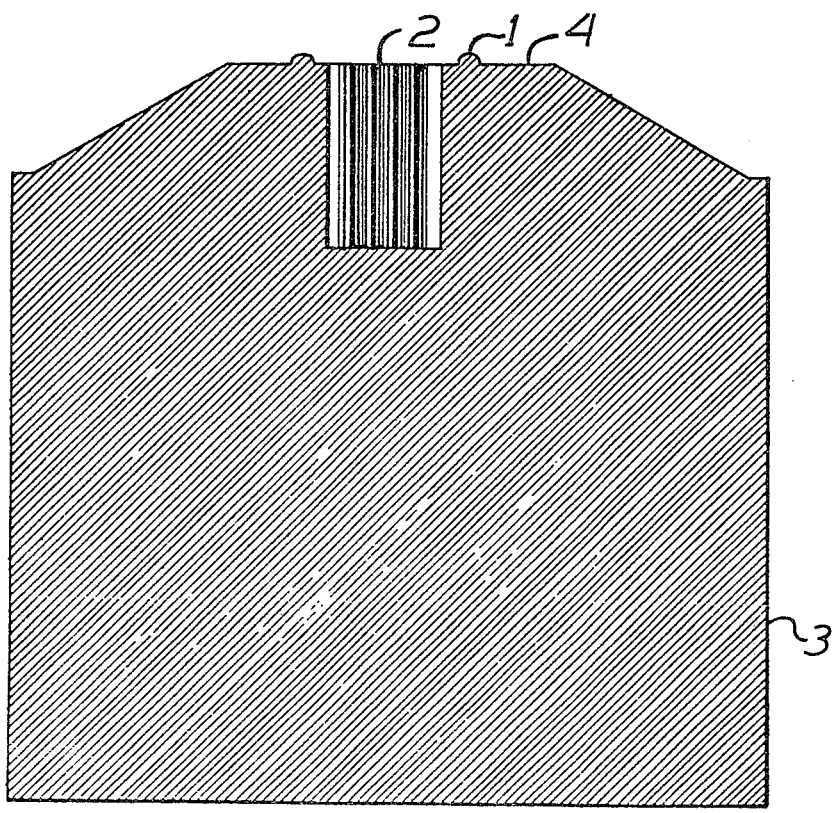
FIG. 2 is a cross-sectional view as indicated by line II—II of FIG. 1.

Referring first to FIGS. 1 and 2, there is illustrated a carbon article that can be manufactured using the present invention. This particular carbon article is an anode which may be used for producing aluminum metal in a process based on the electrolysis of alumina dissolved in a molten cryolite-based solvent. The anode 3 has on its upper face 4 protrusions 1 which are useful for the spacing of such anodes from one another during their baking in a furnace. Additionally provided in the upper face are stub holes 2. These stub holes are later provided with metal stubs for the conduction of electrical current from a current source into the anode.

Figure 4A:
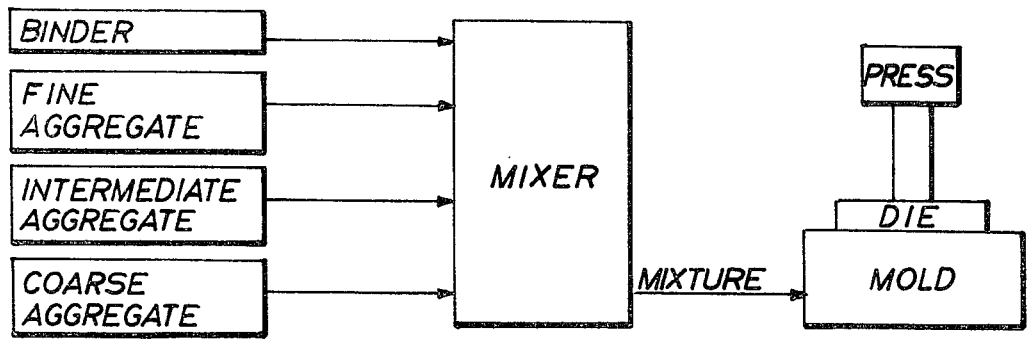
FIGS. 4A and 4B are schematic diagrams illustrating both the method and the plant aspects of the present invention.

Such anodes are typically manufactured, as shown in FIG. 4A, by mixing a selected combination of coarse, intermediate and fine aggregate with binder in a mixer and forming the resulting mixture using a hydraulic press in molds containing the mixture. In the mixer, which may e.g. be of the Baker Perkins Koneader continuous type, the aggregate and binder are kneaded until the aggregate is well wetted by the binder. Temperature at mixing may be about 150° C., while forming will be at e.g. 130° C. Typical size distributions for the coarse, intermediate and fine fractions are given in Table I of U.S. Pat. No. 3,855,086, issued Dec. 17, 1974, in the names of W. C. Sleppy and R. J. Campbell, for "Carbon Anode Protection in Aluminum Smelting Cells". Exemplary proportions of coarse, intermediate and fine fractions are given below with respect to FIGS. 5 and 6. The pitch will, for example, have a softening point of 110° C. as determined by ASTM Method D2319.

Examples of suitable carbon aggregate are delayed coke and fluid coke. These are calcined, in keeping with aluminum industry practice, to drive off essentially all volatiles. Examples of suitable binders are coal tar pitch and petroleum pitch.

Figure 4B:
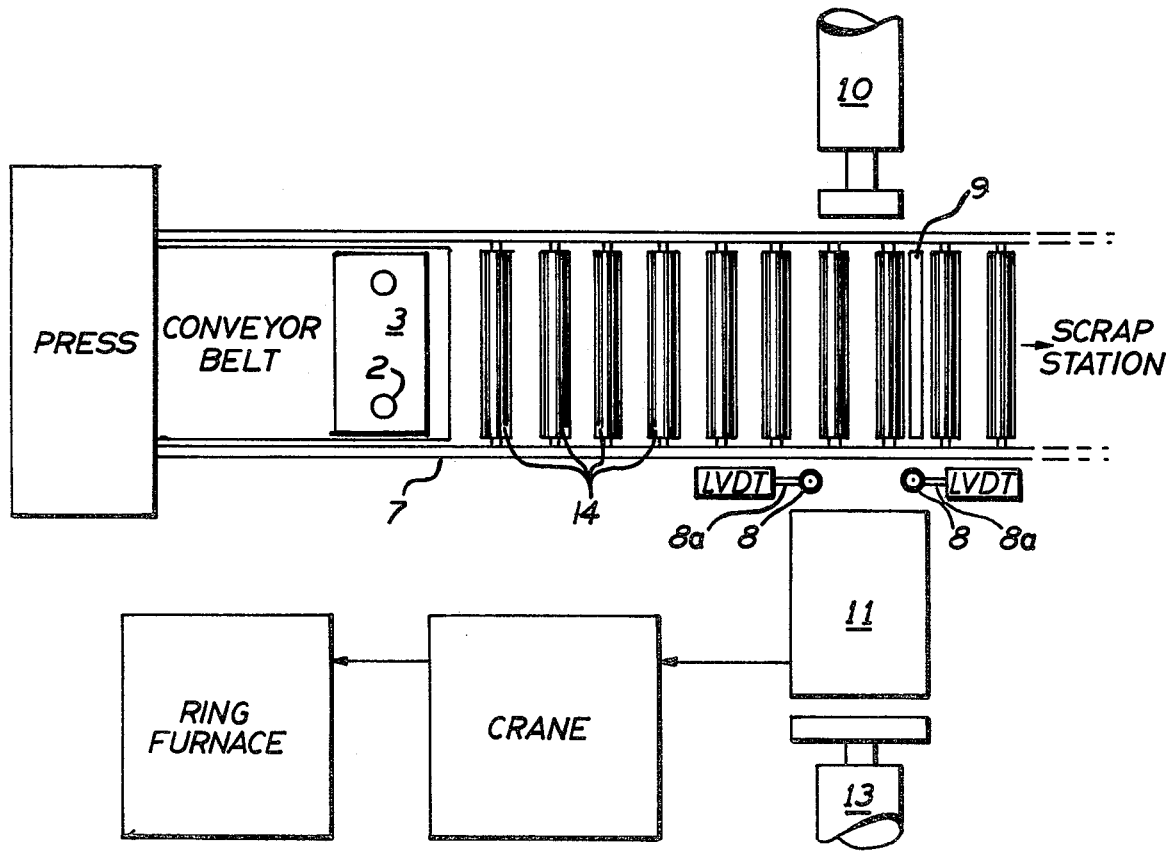

As illustrated in FIG. 4B, the formed carbon anodes 3 are transported on a conveyor system away from the forming operation. Their temperature cools sufficiently that the pitch viscosity increases to such an extent that the formed anodes may be eventually lifted by a crane and set down into a ring furnace for baking.

Figure 3:
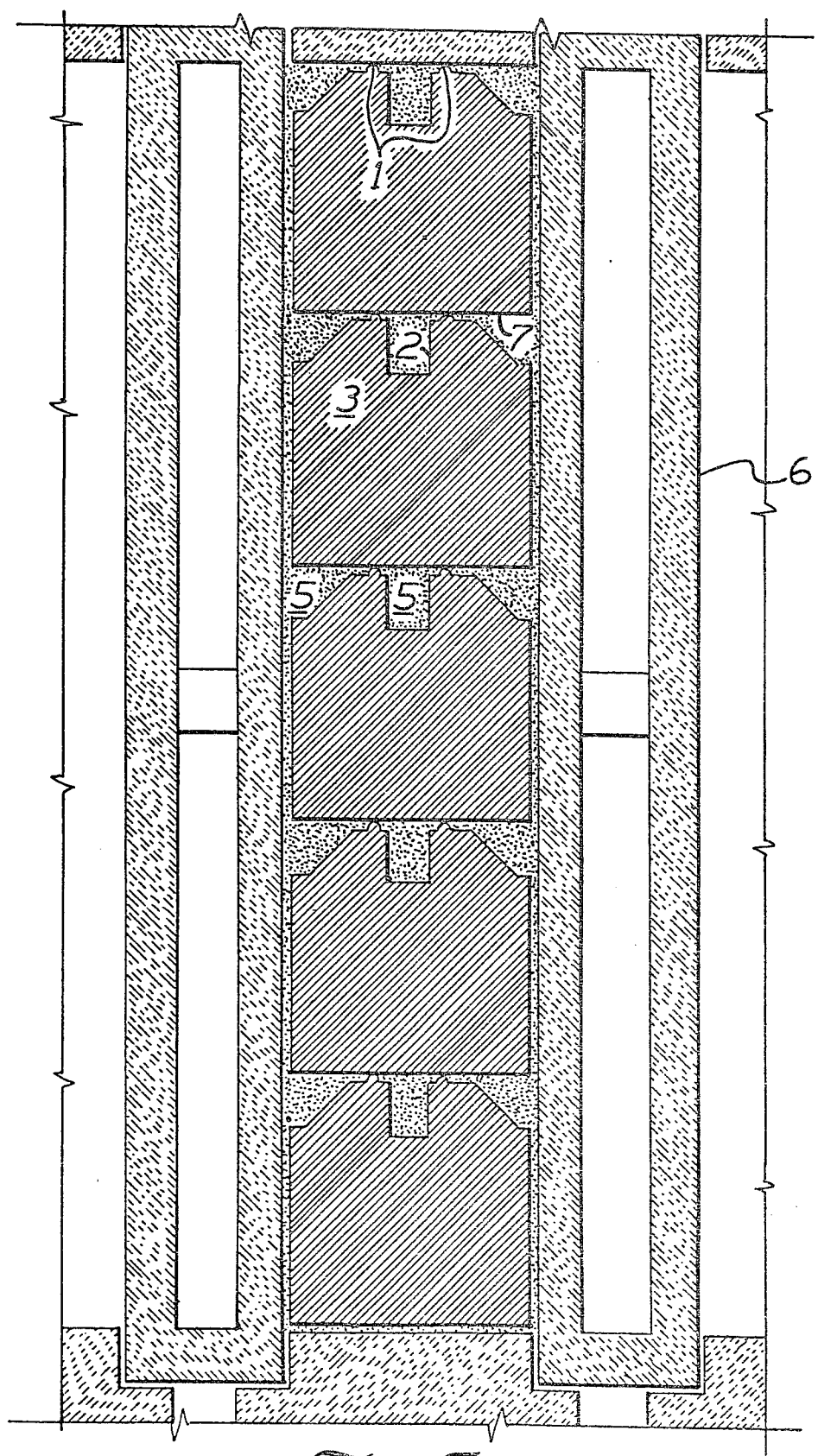
FIG. 3 is a cross-sectional view of a portion of a ring furnace containing electrodes for the invention, the plane of the cross section lying in the horizontal.

Their situation in a ring furnace is illustrated in FIG. 3 where it will be noted that the anodes were first tilted on their ends before being lifted down into the furnace so that protrusions 1 space adjacent anodes from one another. The details of the operation of ring furnaces are familiar to those skilled in the art and are described, for instance, in U.S. Pat. No. 3,975,149, issued Aug. 17, 1976, in the names of B. J. Racunas and R. Kastelic, for "Ring Furnace". As illustrated in FIG. 3, fluid coke particles 5 are provided in the furnace pit 6 around and between the anodes and in the stub holes 2 for the purpose of guarding against collapse of the stub holes during baking and to protect against air-burning of the anodes while they are at high temperature.

According to the present invention, anodes leaving the forming operation are moved past a dimension sensing device for measuring slump. This dimension sensing device is advantageously constructed on the basis of linear variable differential transformers (LVDT's), one on each side of the anode as it moves off of conveyor system 7, as illustrated in FIG. 4B. This placement, one on each side of the anodes, is so that the measurements will not be influenced by the particular placement of the anodes, left and right in FIG. 4B, i.e. in the direction of LVDT armature movement. The armatures of the LVDT's are activated using sensing rollers 8 mounted on shafts 8a of linear ball bushings, e.g. SUPER ball bushings TWN-8-BG of Thomson Industries, Manhasset, New York. In addition to the use of two LVDT's, it is advantageous to first carry out a positioning of the anodes before they pass between the sensing rollers 8. This positioning of an anode is effected by holding a drop fence 9, in the form of a metal plate, in the way of the anode by pushing the fence up between the rollers of the conveyor system. The powered rollers 14 cause the anode to adjust itself flat against the drop fence. Pallet loading ram 10 the pushes the anode onto pallet conveyor 11. An additional ram 13 is located opposite push-off ram 10 and serves to reject unacceptably wide anodes by returning them to conveyor system 7 for subsequent comminution and use as part of the charge to the mixer.

The armature of each LVDT is spring biased so as to lie in its innermost position. Each armature is moved some measurable distance when an anode is pushed past and onto the pallet conveyor. Each LVDT is connected to a demodulator which produces a voltage output linearly proportional to the movement its armature undergoes.

The voltage outputs of the LVDT's are added at the demodulator, and the resultant sum is used as the input for the deflection of a recorder. The chart resulting from the recorder thus gives a plot of anode width (sum of deflection undergone by the armatures of each LVDT) versus position along the anode for each anode, the conveyor system and recorder chart both running at constant speed. The width itself is taken as the measurement of slump, although it would be possible to subtract the inner width of the die. It does not matter, as long as one calibrates appropriate to the particular measurement used. In general, the maximum slump occurs halfway along the length of an anode, and this maximum value is the one used.

A listing of examples of suitable LVDT equipment is given in Table I. In addition to items mentioned below, shielded coaxial cable may be necessary when the demodulator and/or recorder is placed at a position remote from the LVDT location.

Table I

| Instrument | Manufacturer | Part No. |
| --- | --- | --- |
| Demodulator | Automatic Timing & Controls Co. King of Prussia, PA | 6101F-1X |
| LVDT | " | 6234A02B01PX |

Besides this automated dimension measuring technique, it will, of course, be recognized that it is possible to manually use calipers to achieve the same measurement. Other means of automatic measurement might also be employed, such as non-contacting devices, e.g. laser type.

Figure 5:
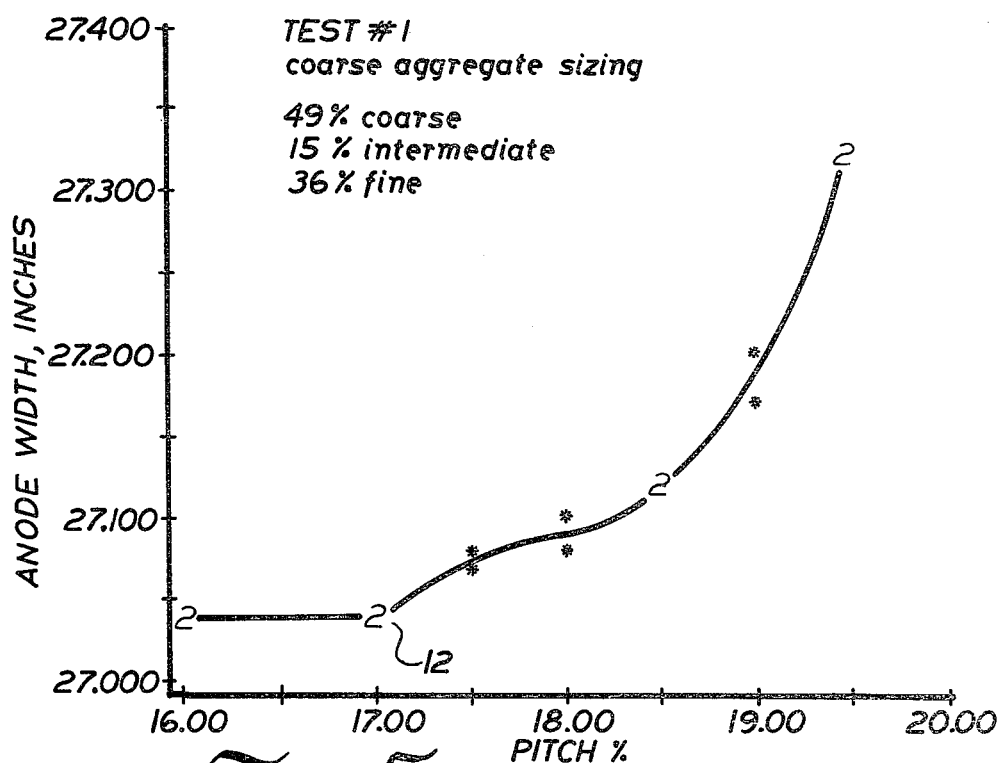
FIG. 5 is a graph of anode width measurement versus binder content for a series of anodes with a standard aggregate size distribution.
Figure 6:
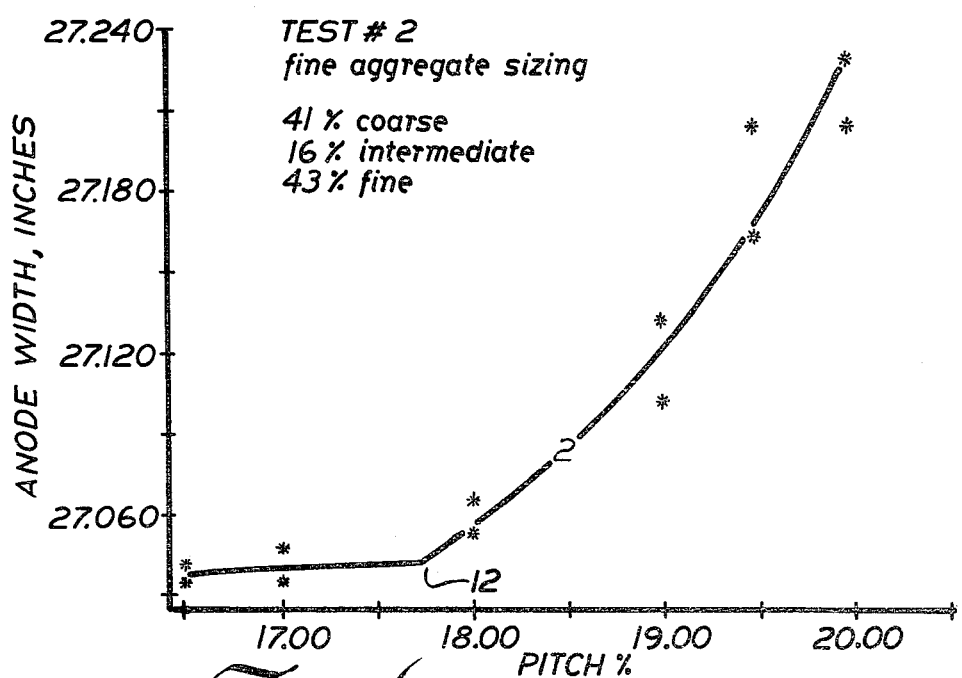
FIG. 6 is a graph of anode width measurement versus binder content for a series of anodes with a finer aggregate size distribution than that shown in FIG. 5.

FIGS. 5 and 6 are the results of two separate tests in which anode slump was measured as a function of pitch content. The asterisks are single data points while the numeral "2" represents two data points at the same location. The tests differ only in the relative amounts of coarse, intermediate and fine fractions. The test of FIG. 5 uses a standard aggregate size distribution, while that of FIG. 6 is for a finer aggregate. The vertical axis on both graphs gives the maximum anode width as a measure of slump, and it will be seen that the onset 12 of major slump occurs at a lower pitch value for the coarser aggregate of FIG. 5. The aggregate for the tests of FIGS. 5 and 6 was delayed coke, and the pitch was coal tar pitch.

The weight and temperature of the anode affects the relationship between the measured size of the anode and its binder content. The slope of the curve in FIGS. 5 and 6 holds true for large anodes weighing on the order of 1,000 lbs. or more. Smaller anodes, weighing 500 lbs. or less appear to be more affected by entrapped air in the green mix which expands when mold pressure is released than by slumping. Since the amount of entrapped air in the anode is inversely proportional to the amount of binder, a plot of anode dimension versus binder content can show a downward slope. As anode weight is increased, slumping becomes more pronounced and tends to obscure the effect of air expansion. Larger anodes tend to cool more slowly than smaller anodes and are frequently measured when they are above the softening point of the binder, thus increasing the tendency to slump. For larger anodes, one obtains an upward slope in a plot of anode dimension versus binder content as shown in FIGS. 5 and 6.

Figure 7:
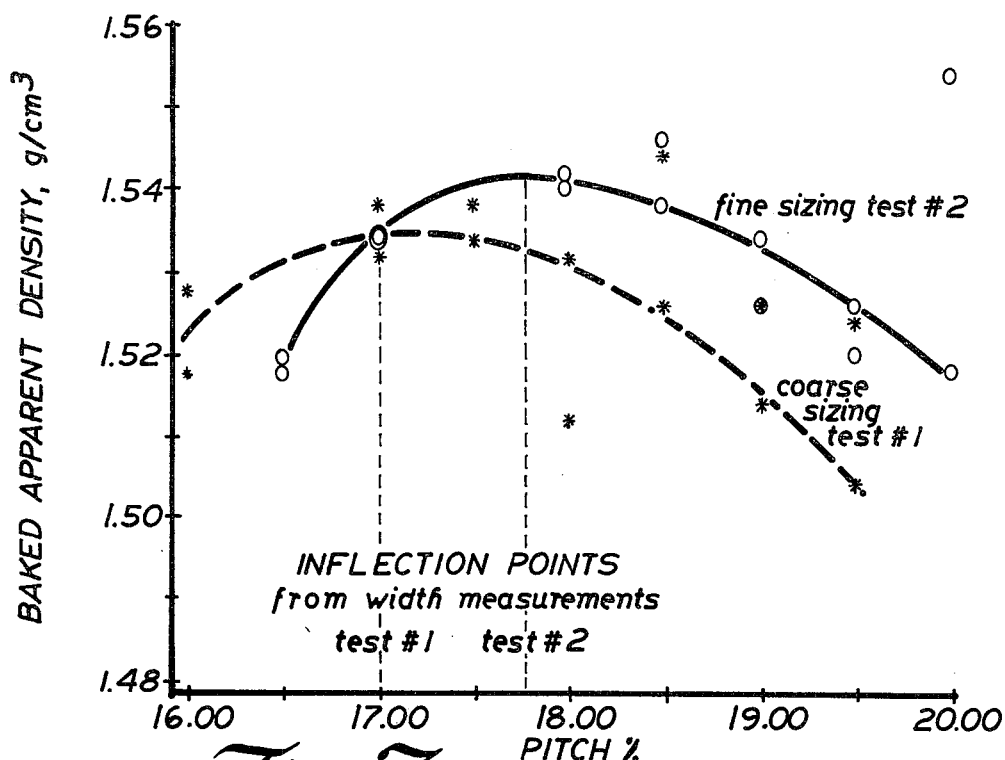
FIG. 7 is a graph of baked apparent density versus binder content for two different types of aggregate size distributions for a series of anodes.

It has also been discovered that the pitch value for the onset of major slump coincides, for practical purposes, with the pitch value for maximum baked apparent density in a plot of baked apparent density versus pitch content, as shown in FIG. 7.

What this means, for practical purposes, is that, for a given aggregate sizing, one need simply watch for the onset of major slump using the width measuring apparatus in order to know that the correct amount of pitch is being used in order to get maximum baked apparent density. What is involved here is a type of feedback system where one strives to put in as much pitch as the given aggregate will take. When the width measurements indicate that slump is becoming major, then subsequent batches of pitch and aggregate will be compounded with a somewhat reduced amount of pitch. Such adjustments can be made manually or by machines controlled by the output of the LVDT's.

Of course it is not necessary according to the present invention that one operate right at the onset 12, the point of inflection, in FIGS. 5 and 6. For example, it may be desired to operate somewhat into the region of major slump in order to better obtain the advantages of maximized pitch content in the anode. Thus in the case of FIG. 6, 18% pitch might be used, and the anode width to be looked for would be 27.060 inches. As the amount of pitch increases, a problem of sticking together of anodes in the ring furnace can arise, but this is overcome by provision of the protrusions 1. Pitch which exudes during baking then only causes bonding between adjacent anodes at the locations of the protrusions 1, and the anodes are later easily broken apart because of the limited extent of the bonding, it being limited only to the location of the protrusions 1.

An advantage of the present invention is that it allows one to observe the occurrence of unexpected changes in the aggregate being fed to the mixing operation. For example, if one were using the aggregate of FIG. 6 at an 18% pitch content and the aggregate size distribution would change due, for example, to a blockage of the fines input door, so that the size distribution of the aggregate would then change to that of FIG. 5, then one would begin to notice that the anode was slumping more and giving a width measurement now at 27.090 instead of 27.050. The process operators are then able to note the change in the process conditions and take appropriate countermeasures. For instance, if an aggregate of a new size distribution is in fact being supplied and will be supplied for some time to come, then the countermeasure would be to decrease the pitch content to perhaps 17.40% in order to operate on the same part of the curve of FIG. 5 as was being used for the aggregate of FIG. 6. If the cause was a blockage of the fines feed door, then the countermeasure would be to unblock the door.

Another advantage of the present invention is that slump measurement of the unbaked, or "green", anodes allows one to predict when baking of an anode is going to result in an unsatisfactory product. Consequently, a green anode showing an unsatisfactory slump can be called out, comminuted and fed back as part of the charge in the mixer.

Figure 8:
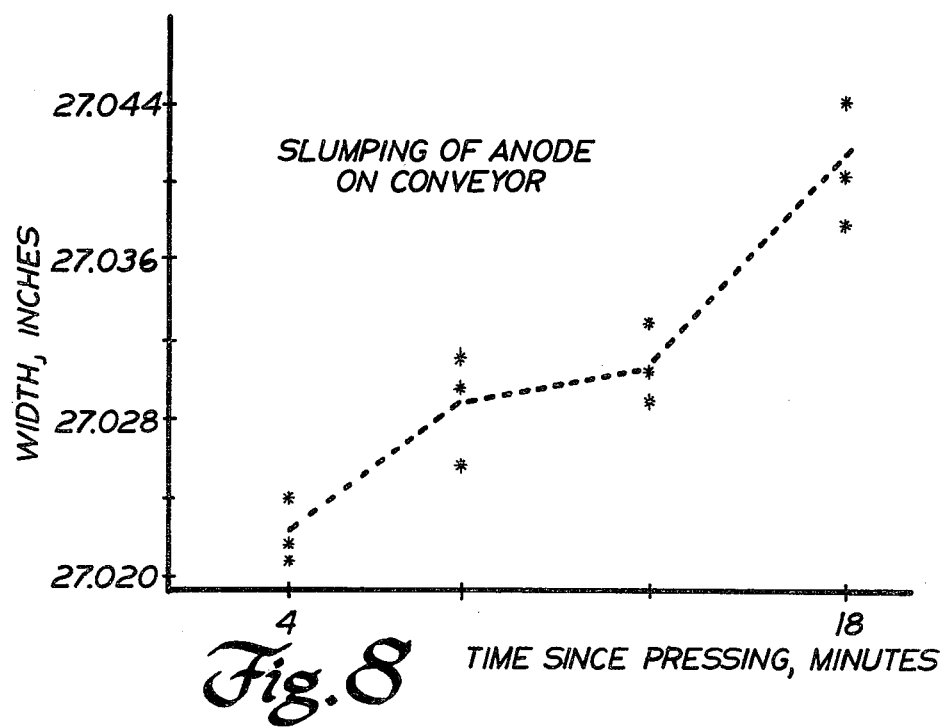
FIG. 8 is a graph of anode width measurement versus time since pressing for a given anode.

It has been found that the amount of slump is a function of the time which has elapsed since the forming operation. For example, if the anodes come out of the forming operation and then move along a conveyor at some fixed speed, then the slump noticed will be a function of how far down the conveyor the width measurements are made. This is illustrated in FIG. 8. Thus in the practice of the present invention one must always measure anodes which have set the same amount of time following forming. Or else, one must compensate when measurements at different times are to be compared. It will be apparent, of course, that the slump will approach a terminal value as the temperature of the anode decreases to room temperature, since then the viscosity of the pitch will be so high that the slump stops increasing.

Measurements were also made for slump using the lengths of the anodes as well as the widths and while as shown in FIG. 9 the dimensional changes are different depending on whether width or length is being measured, there is an approximately parallel, linear functional relationship between width and length measurements so that either could equally well be used in the present invention. Notice that in this figure the analysis of slump is presented in terms of the difference between the slumped dimension and the original dimension (original dimension equals the inner die dimension).

For the width measurements, also checked was the effect of how far up the sides of the anodes the measurements were made. As illustrated in the sketch in FIG. 10, measurements were made at the bottom, center and top at the sides of the anode, i.e. the distances respectively 4, 10 and 14 inches up the sides. The results are plotted in this FIG. 10, and it will be seen that discrimination is better when the measurements are taken low on the anode.

Percentages herein are on a weight basis unless stated otherwise. The binder percentage is calculated with respect to the total weight of binder and aggregate.

It will be understood that the above description of the present invention is susceptible to various modifications, changes and adaptations, and the same are intended to be comprehended within the meaning and range of equivalents of the appended claims.

What is claimed is:

1. A method of preparing carbon articles comprising the steps of mixing binder and carbon aggregate, forming the resulting mixture into an article, measuring the slump of the article at least to hundredths of an inch following the forming and prior to baking, and, if necessary, changing the relative proportions of binder and carbon aggregate in subsequent executions of the mixing step to yield a target amount of slump.

* * * * *